United States Patent [19]
Bernstein et al.

[11] Patent Number: 5,154,083
[45] Date of Patent: Oct. 13, 1992

[54] INSTRUMENT INSOLATOR AND METHOD OF MAKING SAME

[75] Inventors: Robert E. Bernstein, Framingham; Edward A. Schmidt, Medfield; Harold Schmidt, Hopkinton; Alan E. Nelson, Franklin, all of Mass.

[73] Assignee: Larad Equipment Corporation, Bellingham, Mass.

[21] Appl. No.: 655,665

[22] Filed: Feb. 14, 1991

[51] Int. Cl.$^5$ .................................................. G01L 7/08
[52] U.S. Cl. ........................................ 73/730; 29/447; 29/890.144; 73/861.47
[58] Field of Search ............... 73/730, 756, 861.47, 73/861.48; 29/447, 890.14, 890.141, 890.142, 890.144

[56] References Cited

U.S. PATENT DOCUMENTS

| | | | |
|---|---|---|---|
| 1,921,001 | 2/1929 | Ohlson | 73/110 |
| 3,107,234 | 10/1960 | Stewart | 260/46.5 |
| 3,163,529 | 12/1964 | Jewett | 73/730 |
| 3,513,429 | 5/1970 | Helsop | 29/447 |
| 3,544,672 | 12/1970 | Goda et al. | 29/447 |
| 3,563,095 | 2/1971 | Robinson, Jr. | 73/730 |
| 3,680,187 | 8/1972 | Murray | 29/156.7 |
| 4,218,926 | 8/1980 | DeVisser | 73/730 |
| 4,489,018 | 12/1984 | Ball | 264/25 |
| 4,534,224 | 8/1985 | Raftis | 73/730 |
| 4,630,635 | 12/1986 | Bernstein et al. | 137/315 |
| 4,763,527 | 8/1988 | Raftis | 73/730 |
| 4,840,068 | 6/1989 | Mayhew, Jr. | 73/730 |
| 4,868,224 | 9/1989 | Harasin et al. | 521/124 |
| 4,885,121 | 12/1989 | Patel | 264/255 |

OTHER PUBLICATIONS

Plast-O-Matic Valves Inc. Catalog, GGMU-2 Bonninger-Petter, Section E13-11.
Red Valve Condensed Catalog, pp. 16 and 17.
Moyno Series W. Catalog.

Primary Examiner—Donald O. Woodiel
Attorney, Agent, or Firm—Lawrence S. Cohen

[57] ABSTRACT

A method of making an isolator flow device for use in a process fluid system. The device has a body and an elastomeric sensor ring in the body, through which process fluid flows. There is an annular space outside the sensor ring for communicating outside the body to sense pressure on the ring by the process fluid. In the method, the ring is formed by in-situ molding to the body, and is bonded to the body at its opposite ends, leaving an intermediate portion unbonded. Then, the elastomer will shrink annularly to create an annular space between the body and the ring.

13 Claims, 4 Drawing Sheets

INSTRUMENT INSOLATOR AND METHOD OF MAKING SAME

BACKGROUND

This invention relates to flow-through devices for connection into a fluid flow system. In particular it relates to instrument isolator type devices in which an instrument for measurement of some characteristic of the process fluid, such as pressure or temperature, or to react to a change in some characteristic such as a switch is to be responsively connected to the process fluid, but physically isolated from the process fluid.

Isolation devices are commonly installed in piping systems wherein the process fluid is injurious to or is detrimental to proper operation of instrumentation used to measure certain properties of the flowing fluid. The isolation device physically separates the instrument from the process fluid, while permitting accurate measurement of the specific process variable via the attached instrument. In the flow-through type isolator the sensing member is usually an elastomer member forming a conduit coincident with the pipe cross-section where the variable is to be measured. In these elastomer flow-through isolation devices, the sensing member, usually sleeve or spool shaped, is manufactured separately and is mechanically attached to the isolator body by use of metal or plastic flange rings. The combined geometry of the body and the sensing member creates an annular space between the body and the sensing member in which is placed a sensing fluid to hydraulically link the sensing member to the instrument.

It is consistently a problem addressed by the various designs to obtain a space between the sensing member and the instrument in a construction which is low cost and easy to manufacture, reliable, properly sensitive to the process fluid variables and which will be fully sealed against leakage of both the process fluid and the sensing fluid. The present invention provides new and advantageous means and methods for achieving these goals.

SUMMARY OF THE INVENTION

The present invention is a method of making an isolator type flow device and such a device made by the method. In the method the body of the flow device is used in an elastomer molding process as part of the mold which defines a mold cavity. The portion of the body which forms the mold cavity is a cylindrical interior wall. End faces of the body may also be used to form the mold cavity. Ends of the interior wall and/or end face portions are prepared with a bonding agent, but the intermediate part between the bonded ends is not. Then, the elastomer raw material is flowed under pressure into the heated mold cavity, cured and subsequently cooled usually after demolding. Due to preferential circumferential shrinkage of the elastomer during cooling, it displaces radially inwardly pulling away from the interior cylindrical wall in the unbonded area, leaving a small annular space. The annular space may also be formed by volumetric shrinkage. The result is a sensor ring bonded to the body at its axial ends, through which process fluid can flow and an annular space which can be filled with another fluid usually a hydraulic fluid to operate an instrument in response to movement or position of the sensor ring as it flexes in response to pressure of the process fluid.

Thus the invention is a method of in-situ molding of an elastomer sensor ring to a rigid body of a flow device, wherein an annular space between the elastomer and the rigid body is formed by shrinkage of the elastomer. In practicing the method the rigid body becomes part of the elastomer mold, defining a mold cavity in which the elastomer sensor ring is formed. The elastomer ring is heat bonded to the axial ends of the body through-passage during molding, while the intermediate portion between the ends is unbonded. In the molding and cooling process the annular sensor ring will shrink causing it to form an annular space between the body and sensor ring. In on form of the invention the shrinkage is by preferential circumferential shrinkage to radially inwardly displace the sensor ring. Due to being bonded at the ends, it will take a bowed shape. The annular space may also be formed at least in part by volumetric shrinkage. Prior to the molding operation, the surfaces of the isolator body that will be bonded to the elastomer are prepared for elastomer bonding using a bonding agent; while the intermediate portion which will become part of the boundary of the annular space is prepared for elastomer release rather than bonding.

Also, the sensor ring is formed with a sealing bead in combination with a recess in the body end faces such that the sealing bead extends beyond the end face prior to installation but can be compressed when the isolator is installed, in such manner that adjoining piping system members can "bottom-out" on the body end faces while effectively compressing the sealing bead for good sealing effect. An unfilled portion of the recesses is available to accept distortion flow of the elastomer when it is compressed. An alternative sealing bead comprises a ring of rounded cross section integrally molded as part of a flange portion of the sensor ring. This sealing ring can mate into a groove to provide a good sanitary seal for example in the commonly use Tri-Clamp configuration.

DETAILED DESCRIPTION OF THE INVENTION

Figure 6:
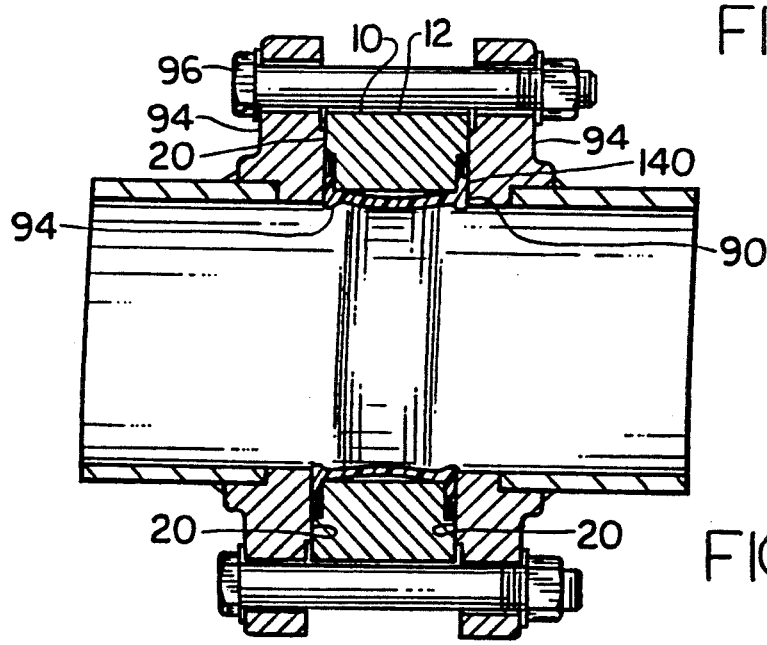
FIG. 6 shows a cross section of the isolator of FIG. 1 through 4 installed in a fluid system.

This description will commence with the steps of the method as shown in FIGS. 1 through 4 as implemented in order to make the products shown in FIG. 6. Alternative methods and construction are shown in FIGS. 6A through 10.

Figure 1:
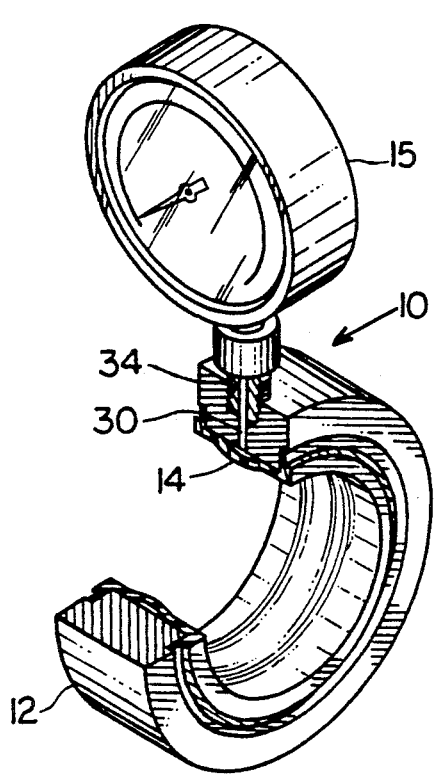
FIG 1 shows a partially sectioned perspective view of a wafer style isolator made using the method.

Now with reference to FIG. 1, the isolator 10 has a body 12 and a sensor ring 14. An instrument 15 is shown attached to the body 12.

Figure 2:
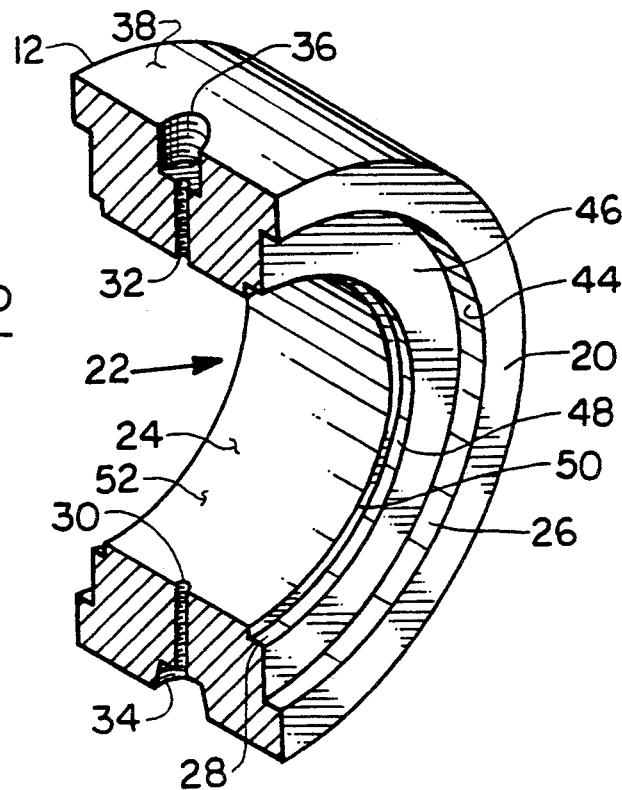
FIG. 2 shows a partially sectioned perspective view of the body of one type of isolator made by the method, called a wafer style isolator.

Referring to FIG. 2 the method of making this isolator commences with manufacture of the body 12. The body 12 is an annular metal member having end faces 20 and through-passage 22 which is typically cylindrical and is open at each end face. The through-passage 22 is defined by an interior wall 24. In the end face 20 is a first circular recess 26 of relatively shallow axial depth and a second axially deeper recess 28. The second recess 28 is both a recess in the end face 20 and in the interior wall 24, and communicates with the first recess 26, these recesses being concentric, the first recess 26 being exterior to the second recess 28. General references to the "ends" or "axial ends" or "end portions" in this description are intended to mean any or all of the axial opposite ends of the interior wall 24, the recesses 26 or 28 or the end faces 20, so long as there is defined a portion at either end of the body and an intermediate portion of the through-passage 22 between the ends. Drilled and threaded holes 30 and 32 extend from wall 24 outwardly. A pipe threaded hole 34 is open to hole 30 and is for the mounting of an instrument. A machine threaded hole 36 is open to hole 32 and is for bleeding of fluid, and in use is normally closed with a plug and screw. Both the pipe threaded hole 34 and the machine threaded hole 36 open to an outer peripheral surface 38.

Figure 3:
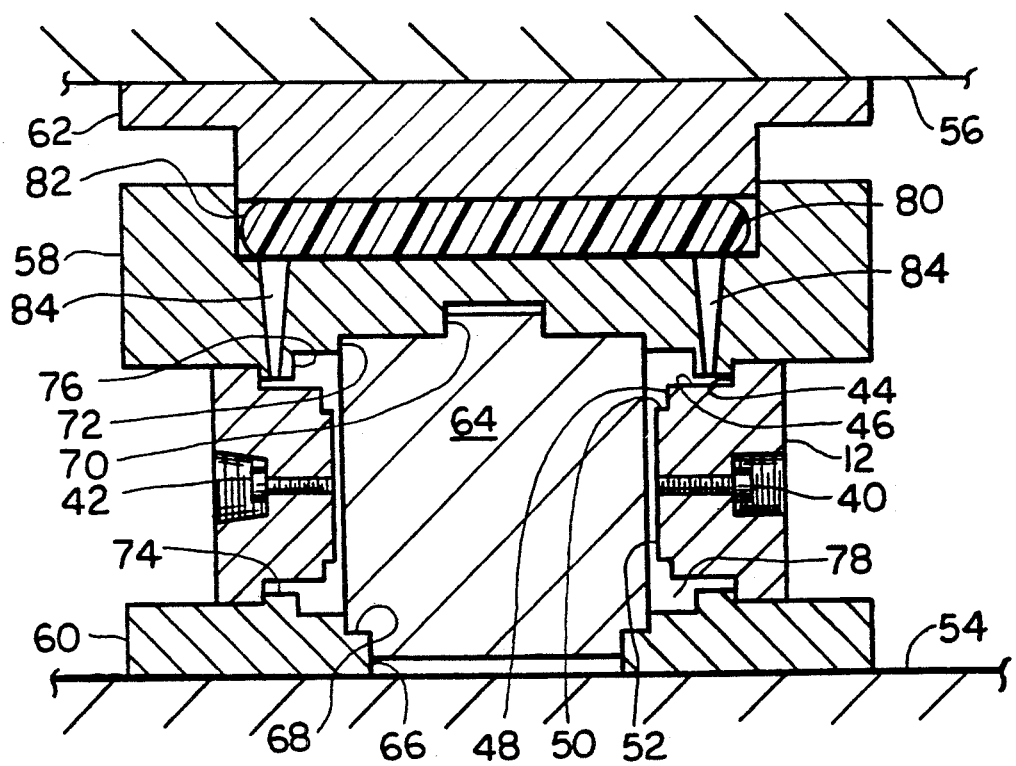
FIG. 3 shows an initial mold set up for practicing the method of the invention.
Figure 4:
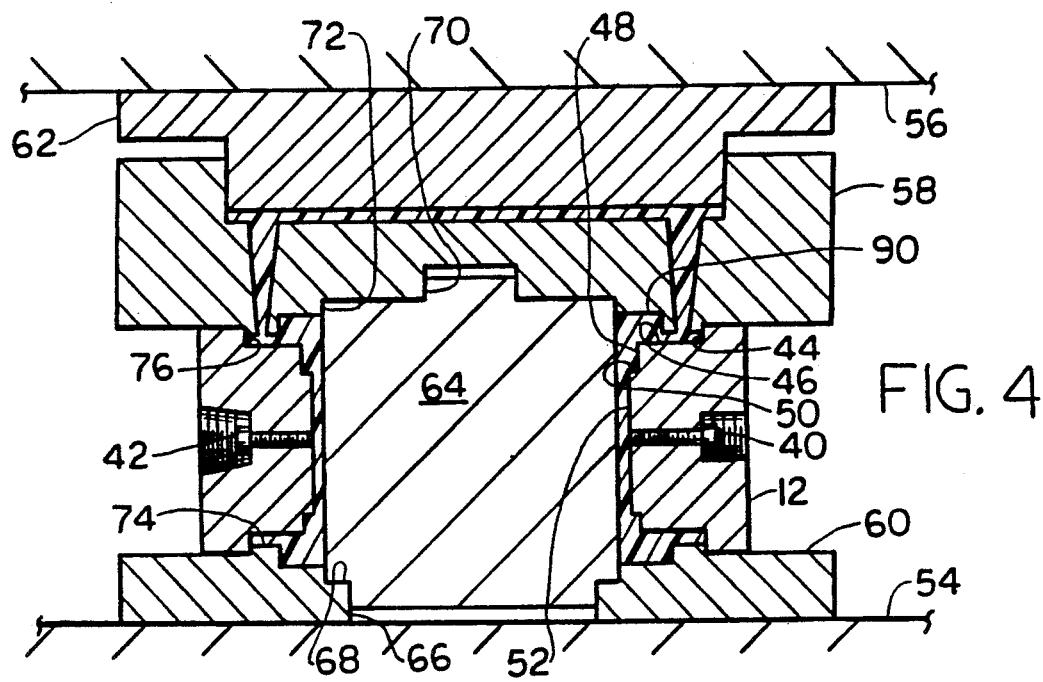
FIG. 4 shows a further step in the method of the invention.

In preparation for the molding process to be described the holes 34 and 36 are sealed by screw plugs 40 and 42 (FIGS. 3 and 4). The surfaces formed by the recesses 26 and 28, that is surfaces 44, 46, 48, and 50 will have a bonding material applied. Between the recesses 28 is an intermediate portion 52 of the interior wall 24. A typical preparation of the body 12 is sandblasting, solvent washing and application of a 1 or 2 coat bonding system. A one-coat system has a combination primer and adhesive. A two-coat system has a first primer coat and a second adhesive coat. A release agent is applied to the intermediate portion 52.

Referring to FIG. 3, the isolator body 12 is shown placed in a transfer molding press, the exact construction of which is not critical to the practice of the invention, but which typically comprises a mold lower platen 54 and a mold upper platen 56 along with heating means (not shown). The mold comprises a mold pot 58, a mold base 60, and a mold plunger 62. A cylindrical mold mandrel 64 is inserted centrally of the body 12. The mandrel 64 is located in the mold base 60 by a hole 66 and a shouldered recess 68 and in the mold pot 58 by a hole 70 and a shouldered recess 72. The body 12 is located in the mold base 60 by a ring 74 and in the mold pot 58 by a ring 76.

Thus an annular mold cavity 78 is defined in part by the end face recess surfaces 44, 46, 48 and 50 which are coated with bonding agent, and by the intermediate surface 54 which is coated with a release agent.

Uncured elastomer raw material 80 is loaded into the space 82 between the mold plunger 60 and the mold pot 58 and is flowable into the mold cavity 78 through transfer sprues 84.

Referring to FIG. 4 the mold plunger 60 has been is pushed by the mold press upper platen 56, to cause the uncured elastomer to fill the mold cavity. During this process the entire mold is heated by normal heat molding means. Typical temperatures are in the range of 300°–350° F. although suitable raw materials are known which operate both above and below this typical range. The exact molding process is according to conventional well known elastomer molding technology.

After the molding and curing is sufficiently completed the body 12 now with the molded and bonded sensor ring 14 in place and mandrel 68 are demolded, that is removed from the mold and the mandrel 68 is removed. Cooling continues to ambient temperature. In general it is understood that shrinkage occurs during the cooling period, and the cooling takes place for the most part outside the mold. Therefore, for clarity molding and cooling are described separately; however it is not intended to create any precise distinction, since the basic proposition of shrinkage and its result in this invention is not dependant on this distinction.

The elastomer may be selected from typical elastomers used in sensor rings which contact process fluids. Different elastomers may be chosen depending on the process fluid and variables related to the geometry of the mold cavity, operating environment factors and cost as well as other factors normally considered for the molding process and use of the end product. However, as will be explained, in the practice of this invention it is necessary that the elastomer be of the type which will shrink during the manufacturing process, for it is the shrinkage during cooling which causes formation of the annular space as will be described below. The shrinkage takes place during cooling from the elevated molding temperatures to ambient temperature. Materials which can be used are, natural rubber, chloroprene, nitrile, chlorsulfonated polyethylene, ethylene propylene diene terpolymer, silicone, fluorocarbon polymer and others. It should also be pointed out that other elastomer molding processes carried out at other temperatures, will yield the desired effect as long as the elastomer has the capability to shrink.

Figure 5:
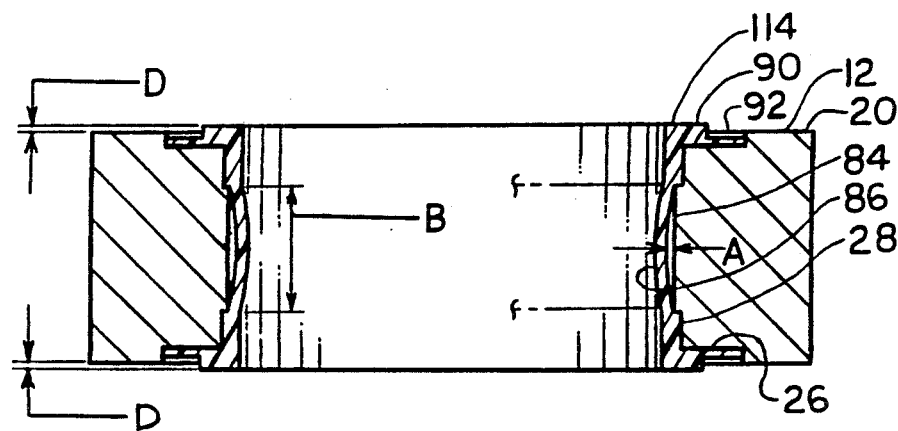
FIG. 5 shows a cross section of the isolator body and sensor ring resulting from the steps illustrated in FIGS. 2 and 3, fully dimensioned.

Finally, after removal from the mold one of the two screw plugs is removed. Air pressure is applied to the open hole to ensure full release of the unbonded portion of the sensor ring from the interior wall 54. Referring to FIG. 5, the body 12 is shown with the sensor ring 14 after the shrinking is completed to produce the annular space 84 bounded by the bowed intermediate portion 86 and as further defined by dimensions A (0.020–0.030 inch) and B (1.176 inch). The mechanism for formation of the annular space 84, is due to reduction in circumference of the unbonded portion caused by shrinkage. This reduction in circumference will cause the unbonded portion 86 to displace inwardly. The sensor ring 14 is bonded to the body 12 at its axial ends within the recesses 26 and 28. Therefore as this portion is not permitted to reduce in circumference, a bow shape will form. It is also appreciated that axial or lengthwise shrinkage takes place which resists or inhibits the inward bowing due to circumferential shrinkage. Therefore the annular space 84 will vary in volume and be subject to variation depending on the degree of preferential or dominance of shrinkage circumferentially over axial shrinkage which is herein referred to as preferential circumferential shrinkage. Inward displacement of the sensor ring unbonded portion is due to preferential circumferential shrinkage. The full set of dimensions is included in FIG. 4 for the 4 inch nominal size of the LARAD Equipment Corporation Series 32 Isolator.

There is no exact definition of the conditions or geometry to achieve the annular space needed which must however contain only a minimal volume of fluid to activate most gauges, switches and transmitters. However, the overall effect must be inward displacement caused by preferential circumferential shrinkage. Use of this preferential circumferential shrinkage creates adequate volume to operate these instruments. With this configuration very low pressures and pressure difference and vacuums are able to be measured with reasonable, useful accuracy. The thickness of the fluid layer need be only approximately 10 to 15 mils for most sizes of isolators tested to date. This small volume is beneficial as it yields a minimal temperature effect for most reasonable temperature excursions found in the chemical industry.

Referring to FIGS. 4 and 5, the construction of the mold, and the recesses 26 and 28 will produce rectangular beads 90 on each end, which extend beyond the end faces 20 by the amount shown in dimension D. In general, the beads 90 must extend in this dimension by a sufficient amount that good sealing will take place when installed in a piping system as will be explained. Also the volume 92 is left void on each end in order to accept distortion flow of the bead 90 when it is compressed.

FIG. 6 shows a LARAD Equipment Series 32 Wafer Type Isolator which is the type described above, installed in a piping system. The isolator 10 has been installed between flanges 94, tightened by bolts 96. The beads 90 have now been sealingly compressed, while the flange 94 "bottoms-out" solidly against the end faces 20 of the body 12. The bead 90 has distortion flowed partly into the void 92 and partly into the flow path as shown at 94. This later distortion is not seen as detrimental; however it can be eliminated by providing a chamfered edge, which will fill out upon compression.

Figure 7A:
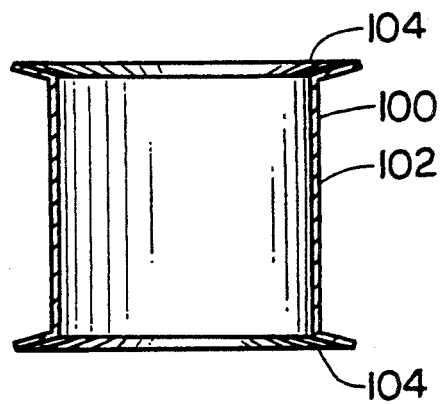
FIG. 7A and 7B show an alternative embodiment in which a liner is used.
Figure 7B:
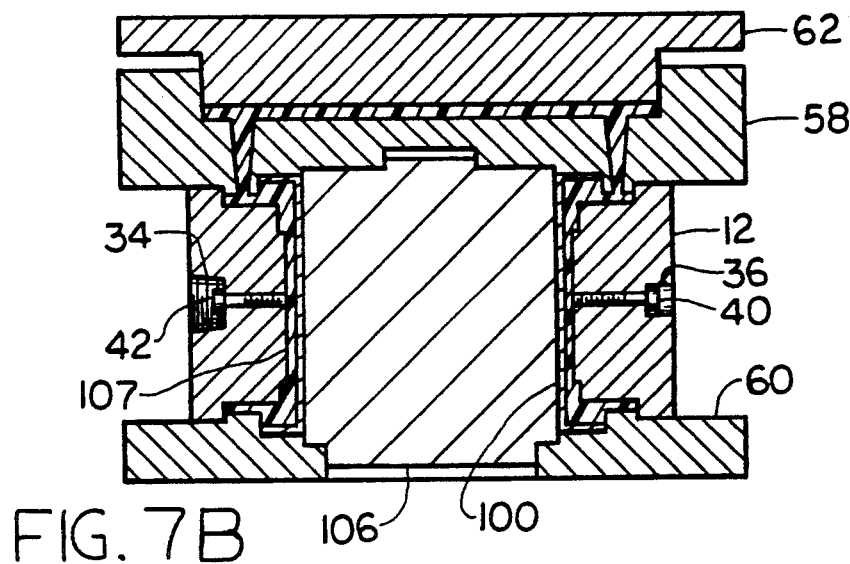

FIG. 7A and 7B shows an alternative additional step in practicing the method of the invention. In this case a semi-rigid plastic liner 100 is to be employed. The liner has a central cylindrical portion 102 and outwardly extending end flanges 104. To prepare for molding the plastic liner 100 is slipped over a mandrel 106 which is then inserted into the mold along with the isolator body and then the process proceeds as previously explained. In this case, the resulting sensor ring has the plastic liner 100 constituting the interior conduit surface for contacting process fluid. The liner material and thickness is selected to permit bowing.

Figure 8:
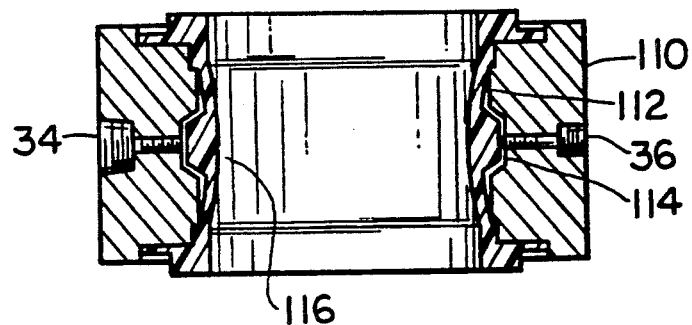
FIG. 8 shows an alternative geometry for forming the annular space.

FIG. 8 shows an alternative geometry which provides a different mechanism for producing the annular space. In this case, the body 110 has an interior wall 112 which has an annular trapezoidally shaped cross-sectional recess 114. Due to the relatively greater radial thickened portion 116, this portion will have an internal radial volumetric shrinkage which will produce an annular space. Therefore, the annular space can be formed alone by this radial volumetric shrinkage independently of any space provided by preferential circumferential shrinkage or the two types of shrinkage means can be combined.

Figure 9:
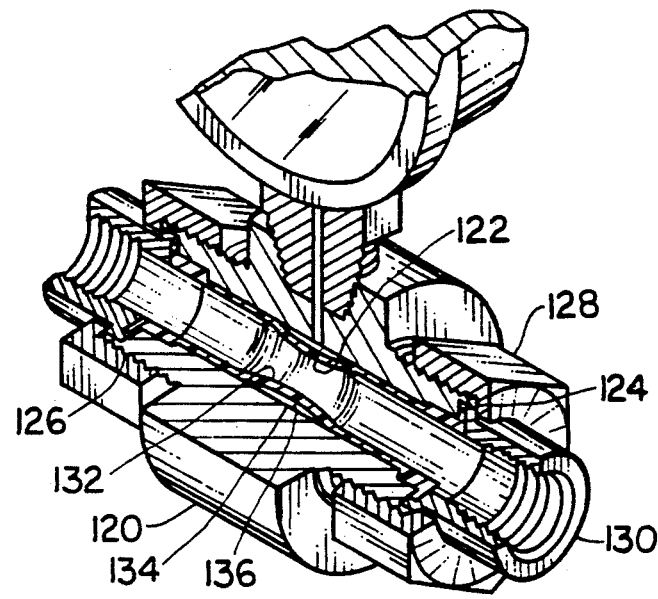
FIG. 9 shows a union connection style of isolator made by the method.

Another embodiment of the invention is shown in FIG. 9. This is a LARAD Equipment Corporation Series 33 DIO-SEAL UNION CONNECTION ISOLATOR. This isolator comprises a body 120 which has an central through-passage 122, end faces 124 and pipe threads 126 at each end. Union nuts 128 are threaded onto the exterior pipe threads 126 capturing tail piece 130. The elastomer sensor ring 132 has a bowed intermediate portion 134 which provides an annular space 136. The structure of the sensor ring end flanges, bead and the end faces of the body are as described for the embodiment of FIGS. 1 through 6.

Figure 10:
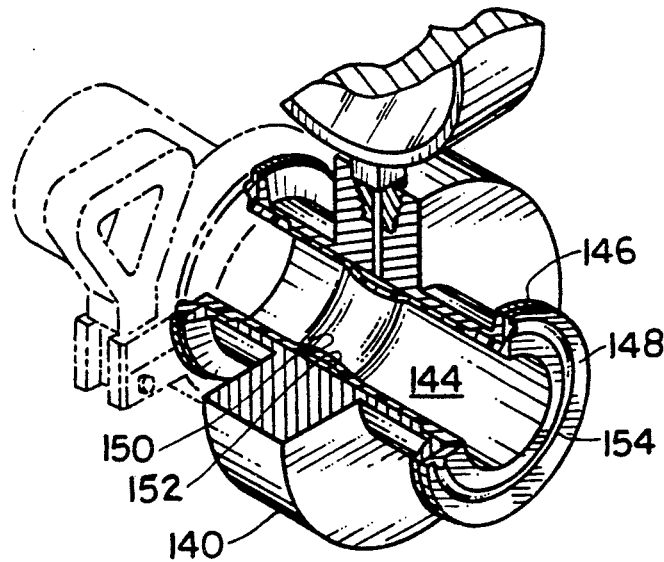
FIG. 10 shows a sanitary style isolator.

FIG. 10 shows a LARAD Equipment Corporation Sanitary DIO-Seal Isolator with ends configured for Tri-Clamp connectors (Tri-Clamp is a product and trademark of Tri-Clover, Inc.). In this construction slurries, food products, bio-fluids and ultra-pure liquids may pass through the conduit. The construction included a body 140, lined with a sensor ring 144. The body 140 has Tri-Clamp sanitary ends 146 which include end faces 148. Formed according to the method described above, the bowed intermediate portion 150 forms an annular space 152. In this embodiment, a circular sealing bead 154 in a round cross-section, preferably about semi-circular is molded integrally as part of the sensor ring 144, at each of the end faces 148. This sealing bead 154 will fit into a mating groove in a mating element captivated by the Tri-Clamp connector to produce good sanitary seal.

In any of the types of construction mentioned above, an annular space bounded by the elastomer sensor ring and the wall of the body opening is formed and in use contains a hydraulic fluid which commingles with the same fluid in the selected instrument, forming a hydraulic link necessary in obtaining accuracy for any variable measurement. It is important to limit, and minimize the volume of fluid in this space, so that temperature variations will not significantly effect the pressure measurement, or whatever other function is to be activated by the hydraulic fluid. Of equal importance is creating this small space in such a way as to make construction of the isolator both reliable and cost effective. The present method, and product made by the method provide an isolator construction which is light in weight, reliable and cost effective. Manufacture of the isolator could not be performed as economically or reliably if an elastomer lining were molded separately and then installed and bonded to the rigid body. Such an operation might require another high temperature process, after installation of the elastomer, in which it would be difficult to create the same elastomer-to-body bond strengths as in the in-situ molding operation herein described. For the majority of elastomers, the in-situ molding process is performed in the range of 300° F. to 350° F. at pressures of 1000-5000 psi. By contrast post bonding a separate liner to a body at these conditions would in many cases cause the then cured elastomer to fail structurally, heat age, embrittle or otherwise be rendered unusable or unreliable.

Although particular embodiments of the invention have been described and illustrated herein, it is recognized that modifications and variations may readily occur to those skilled in the art, and consequently it is intended that the claims be interpreted to cover such modifications and equivalents.

We claim:

1. A method of constructing an isolator flow device which is connectable into a process fluid system of the type having a body and an elastomeric sensor ring inside a through-passage in the body, the sensor ring defining a conduit through which process fluid may flow and having an annular space outside the sensor ring defined by an interior wall of the body through-passage and the sensor ring exterior the annular space communicating exteriorly of the body by means of a hole in the body for connecting an instrument thereto whereby the process fluid and a fluid in the annular space are physically isolated but responsively connected, the method comprising;

forming the elastomer sensor ring by in-situ molding to the body, heat bonding axial opposite ends of the sensor ring to axial opposite ends of the body during the molding process while leaving an intermediate portion unbonded, allowing shrinkage of the sensor ring in the unbonded intermediate portion to cause an annular space to be created between the sensor ring exterior in the intermediate portion and the body through-passage interior wall, said space being sealed at the bonded ends.

2. The method of claim 1 wherein said step of allowing shrinkage of the sensor ring to cause formation of an annular space includes allowing radially inward displacement of the unbonded intermediate portion caused by preferential circumferential shrinkage to cause said unbonded intermediate portion to bow radially inwardly between said bonded ends whereby said annular space is defined by said bowed portion and the adjacent body through-passage interior wall.

3. The method of claim 2 further comprising;

defining a mold cavity for forming the sensor ring, the mold cavity defined in part by the interior wall of the through-passage of the body and having a generally annular ring shape such that preferential circumferential shrinkage will occur during cooling.

4. The method of claim 4 wherein said body also comprises recessed opposite end faces adjacent the axial ends of the through-passage and said recesses also comprising in part the mold cavity to form as an integral part of the sensor ring at each end a flange and a bead facing outwardly and heat bonding the elastomer sensor ring to said end faces.

5. The method of claim 4 further wherein a circular void is provided radially externally adjacent to said bead whereby the end faces may be contact mated to flanges in a piping system and upon compression of the bead upon installation into a piping system the bead may distortion flow into the void area.

6. The method of claim 1 wherein said body has a recess in the interior wall at the unbonded intermediate portion to form a thickened portion of said sensor ring and said step of allowing said elastomer material to shrink includes allowing radial volumetric shrinkage of the thickened portion thereby at least in part forming the annular space.

7. An isolator type flow device comprising;

a body having axial ends and an intermediate portion therebetween and an interior wall forming a through-passage extending through said body between and being open at said axial ends and having an exterior said body also having a passage extending through it from said through-passage at said intermediate portion to the exterior of said body, an annular elastomeric sensor ring which fits closely in said through-passage and has opposite ends that are each securely held onto said body proximate the axial ends thereof in fluid-tight seals therewith and said sensor ring having an intermediate portion between its said opposite ends which is adjacent to and free of attachment to the intermediate portion of the body, said sensor ring being formed by in situ molding to said body from an elastomeric material which will shrink to cause the intermediate portion of the sensor ring to be inwardly displaced thereby to leave an annular space between the intermediate portion of the body and the intermediate portion of the ring and during said in situ molding, heat bonding the sensor ring at its opposite ends to the axial ends of the body.

8. The device of claim 7 further;

wherein said body has axially outwardly facing end faces at each end of the body around the through-passage and at least one circular recess in each end face in communication with the through-passage, the step of forming the sensor ring further comprising forming a bead in said at least one recess at each end said bead extending axially beyond the end face and leaving a circular radially outward part of said recess at least partially void, whereby upon installation into a piping system the end face may be mated with a flange in the piping system and the bead may be compressed and may distortion flow into the void.

9. A method of constructing an isolator type flow device of the type having a body having an interior wall defining a through-passage extending between opposite ends and an annular elastomeric sensor ring comprising;

constructing a mold having a mold cavity which includes the interior wall of the through-passage as part of the mold cavity wall, establishing the geometry of the mold cavity to form an annular elastomeric ring which will shrink upon curing to cause the elastomeric material to inwardly displace and separate from the interior wall of the body through-passage and bonding spaced-apart portions of the elastomeric sensor ring to the body during molding to form an annular space defined by the body through-passage and the elastomeric sensor ring, between the spaced-apart bonded portions.

10. The method of claim 9 wherein:

said bonding is heat bonding of end portions of the sensor ring to axial ends of the body such that only the intermediate unbonded portion will shrink to form a bowed shape to produce the annular space.

11. The method of claim 10 further comprising:

placing within said mold a mandrel spaced from the conduit wall to define a preselected dimension between the through-passage interior wall and the mandrel.

12. The method of claim 11 wherein said geometry is established to allow said elastomeric material to shrink and displace inwardly to separate from the interior wall intermediate the bonded end portions by causing preferential circumferentially shrinkage.

13. The method of claim 10 wherein said through-passage has an annular recess around its intermediate portion to provide a greater thickness dimension in the mold cavity whereby said shrinkage will reduce the thickness of the sensor ring in the thickened portion to establish at least in part, the annular space in said annular recess.

* * * * *

UNITED STATES PATENT AND TRADEMARK OFFICE
CERTIFICATE OF CORRECTION

PATENT NO. : 5,154,083

DATED : 10-13-92

INVENTOR(S) : Robert E. Bernstein

It is certified that error appears in the above-identified patent and that said Letters Patent is hereby corrected as shown below:

On the title page, item (54) and column 1, change "Insolator" to read --Isolator--.

Column 2, line 13, change "on" to --one--

Signed and Sealed this

Ninth Day of November, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,154,083

DATED : October 13, 1992

INVENTOR(S) : Robert E. Bernstein et al.

It is certified that error appears in the above-indentified patent and that said Letters Patent is hereby corrected as shown below:

On title page, item [56] under "OTHER PUBLICATIONS" change "Bonninger-Petter" to --Ronninger-Petter--.

Column 2, line 68 change "products" to --product--.

Column 2, line 67 change FIGS 1 through 4" to -- FIGS 2 through 5--.

Column 3, line 1, change "6A" to --7A--.

Column 3, line 14 change "is both a recess" to --is a recess both--.

UNITED STATES PATENT AND TRADEMARK OFFICE
CERTIFICATE OF CORRECTION

PATENT NO. : 5,154,083
DATED : October 13, 1992
INVENTOR(S) : Robert E. Bernstein et al.

It is certified that error appears in the above-indentified patent and that said Letters Patent is hereby corrected as shown below:

Column 3, line 64 change "60" to --62--.

Column 3, line 64 delete "is".

Column 4, line 7 change "68" to --64--.

Column 4, line 8 change "68" to --64--.

Column 4, line 41 change "54" to --52--.

Column 5, line 63 change "an" to --a--.

Column 5, line 67 change "134" to --136--.

Column 5, line 68 change "136" to --134--.

Column 8, line 57 change "circumfertially" to --circumferential--.

Signed and Sealed this

Twentieth Day of December, 1994

Attest:

BRUCE LEHMAN

*Attesting Officer*     *Commissioner of Patents and Trademarks*